June 1, 1954  D. B. CRAWFORD  2,679,866
APPARATUS FOR DELIVERING FOAMING MATERIALS
Filed July 21, 1950
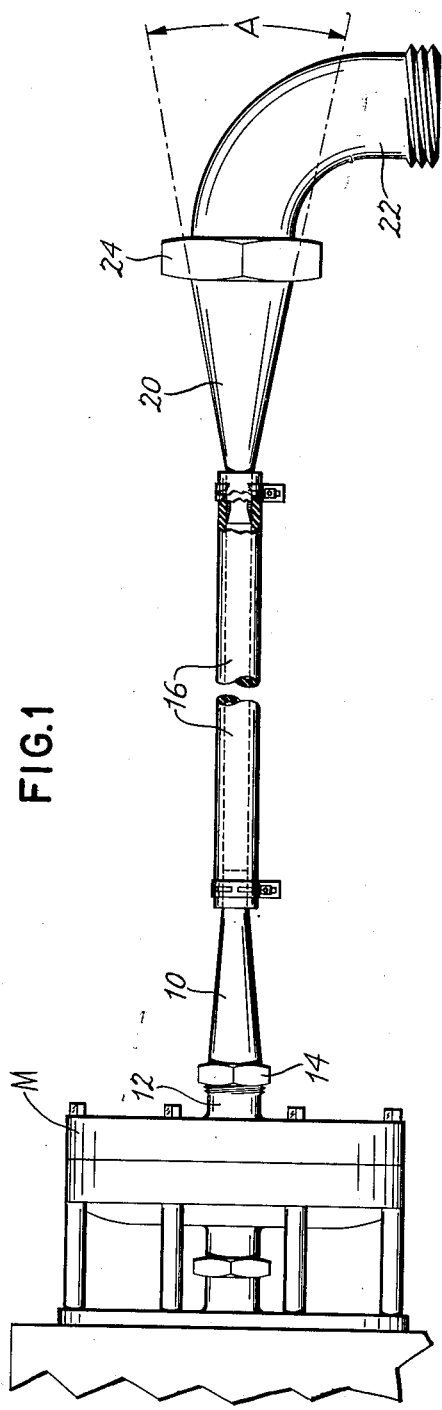
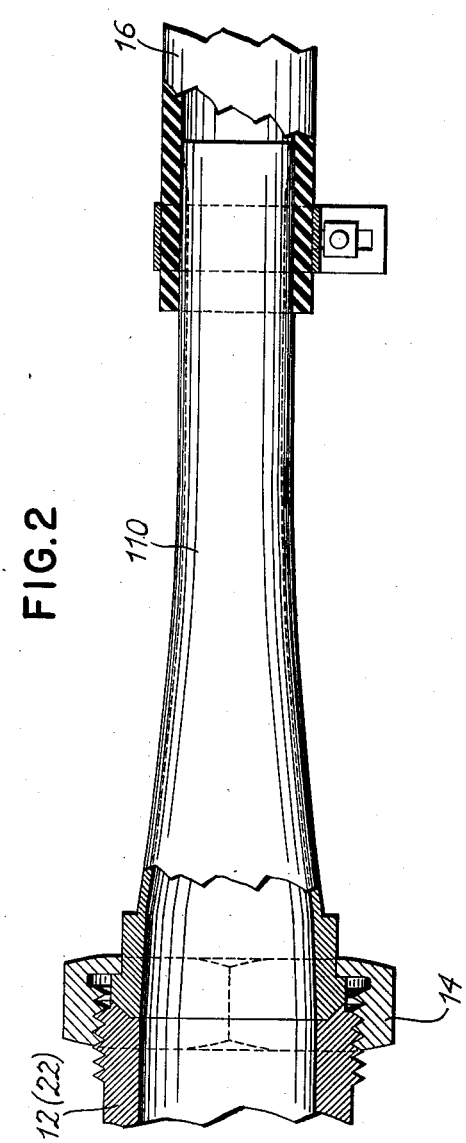
INVENTOR
DUFFER B. CRAWFORD
BY
*George S. Hasting*
ATTORNEY Patented June 1, 1954

2,679,866

UNITED STATES PATENT OFFICE 2,679,866

APPARATUS FOR DELIVERING FOAMING MATERIALS

Duffer B. Crawford, Palisades Park, N. J., assignor, by mesne assignments, to E. T. Oakes Corporation, Islip, N. Y., a corporation of New York Application July 21, 1950, Serial No. 175,257

5 Claims. (Cl. 138—44)

This invention relates to continuous mixers and to continuous foaming devices of the closed type capable of operating under pressure. The mixture to be foamed is introduced into the agitating chamber where it may be whipped into a foam.

It has been a problem to increase the maximum hourly production rate of these machines while maintaining a satisfactory product. By the use of my invention this rate has been enormously increased and efficiency of such machines greatly improved.

The object of my invention is to increase the productivity of the foaming machine and still maintain the quality of the foam. I accomplish a great increase in productivity and in foam quality by contracting the discharge opening of the foaming machine in a novel manner to create a back pressure in the chamber. Merely contracting the size of the discharge line does not produce a satisfactory result, for while it increases the pressure in the mixing chamber, it also renders the foam useless.

By nature, foam structures are tender and, I have found, do not tolerate being forced at high velocity past an abrupt restriction, such as an orifice or a throttle valve. Such treatment destroys the fine texture of the foam by breaking a large number of air cells, thus producing poor quality "open" foam. I have, therefore, devised a satisfactory means for creating a back pressure, while at the same time maintaining, and even improving, the quality of the foam.

Usually these mixers are equipped with a discharge line sufficiently large for foam to issue slowly and gently into a mold. This is a desirable feature, but it does not lend itself to creating sufficient back pressure in the mixer for high productivity.

Equipping the machine with a smaller diameter discharge line creates the necessary back pressure. In order to use this smaller line, I employ a novel contraction nozzle which slowly tapers in diameter from the larger discharge orifice to the smaller line. With this device the foam is not damaged and the desired back pressure is created.

However, foam issuing from the smaller diameter line under this pressure has a higher velocity and cannot be cast gently into the mold. I have, therefore, devised a novel discharge nozzle that slowly expands the smaller line up to the diameter needed to let the foam issue slowly. The foam can then be gently released from the smaller line and cast gently into the mold.

In the accompanying drawings:

Fig. 1 is a side elevation of an apparatus constructed in accordance with the invention; and Fig. 2 is a side elevation, partly in section, of a modification of either of the nozzles of my invention.

Referring to the drawings more particularly and by reference characters, M represents the agitating chamber of a continuous mixer of the type described in Oakes application, Serial Number 657,822 filed March 28, 1946 now Patent 2,600,569 dated June 17, 1952. Contraction nozzle 10 is secured to the discharge port or orifice 12 of mixer M by a female coupling nut 14. A hose or conduit 16 of reduced diameter is suitably secured to the distal and smaller end of contraction nozzle 10. This hose leads to gradually expanding discharge nozzle 20. At the distal and larger end of discharge nozzle 20 there may be secured elbow 22 by means of female coupling nut 24.

Referring to Fig. 1, the foamable material is agitated with gas to a foam within the chamber M. This foam, still compressed by the internal pressure within chamber M, passes through discharge orifice 12 and is gradually constricted in contracting nozzle 10. The progressive constriction within nozzle 10 increases the velocity of the foam but because of the gradual taper does not damage it. As the foam then passes through friction hose 16 sufficient back pressure is created to maintain the desired internal pressure in mixer M. As the foam enters discharge nozzle 20 it follows the walls thereof, slowly expanding in volume and decreasing in velocity. I have found the angle of the taper of discharge nozzle 20 is highly critical. As shown in Fig. 1, angle "A" should preferably be about 5½°. If angle "A" is greater than about 14° the foam may not follow the walls of discharge nozzle 20 but continue in a high velocity uncontrollable trajectory therethrough with the result that too rapid expansion occurs, destroying the quality of the foam. On the other hand, the range of angle of taper of the contraction nozzle 10 is greater and good results may be achieved up to an angle of 25°. The nozzles are so constructed that their inner walls are continuous with the inner wall of the hose as indicated in the cutaway of hose 16 in Fig. 1. This allows the effluent foam to flow in a smooth, uninterrupted fashion leaving no sharp edge to distort the texture of the foam or dead spots wherein latex may accumulate and coagulate.

The elbow 22 has been devised to serve another and important purpose. At the end of a mixing period the final volume of foam is discharged as follows: The supply of foam material is first cut off, the machine and gas supply continuing. In this manner, the last bit of material is foamed and ejected, but as it is blown through nozzle 10 and conduit 16 its velocity is greatly increased because the following gas suffers a much lessened frictional resistance within said hose. The foam thereby is ejected from expansion nozzle 20 in popgun or spurting fashion so that it cannot be delivered into a mold 26.

However, elbow 22 acting as a centrifugal separator avoids this spurting so that even the last portion of the mix may be utilized and delivered in good condition into a mold. This elbow serves also to lessen the undesirable effects of "blow-by" occurring during malfunction of the mixer. "Blow-by" occurs when the gas is not properly incorporated into the foam. This results in convulsive eruption of material from the nozzle 20.

At sufficiently low capacity the contraction nozzle 10 may be omitted from the system and a friction conduit of small diameter employed directly with a discharge port of equally small diameter. In this case, my novel expansion nozzle 20 must still be employed. However, the omission of my contraction nozzle 10 is made possible only because of the lowered velocity consequent from lowered capacity production.

The lowered capacity production means that there will be a lessened velocity at the discharge port 12. Also, an increase in pressure in the mixing chamber results in lessened velocity, since the volume of the foam is reduced by the greater pressure.

However, at the discharge end of the line where the discharge nozzle is located, the pressure is substantially atmospheric. The volume of the foam there is great and its velocity high. Consequently, my novel expansion nozzle must be employed to assure undamaged foam.

Thus, the expansion nozzle is necessary wherever a hose of smaller diameter and short length is employed in accordance with this invention.

A modification of the invention is shown in Fig. 2. Here the nozzle 110 is bell-shaped or curvilinear. In the discharge nozzle, for example, as the diameter is enlarged and the velocity of the effluent foam decreases, the rate of diversion may be increased. The converse is true of the contracting nozzle. That is, as the velocity increases due to the constriction the rate of constriction may be decreased. Thus, Fig. 2 may be regarded as a discharge nozzle if the foam be considered as moving from right to left or as a contraction nozzle if the foam be considered as moving from left to right.

A nozzle squared or polyhedral in cross-section would, of course, also be within the scope of the invention.

I have found that in the frothing of a latex solution with a certain mixer of the type described in the above mentioned Oakes patent, the maximum production of high quality foam per hour of latex foam was approximately 150 lbs. Any attempt to increase this by increasing pressure in the input side of the machine impaired the quality of the foam but I was able to increase this by the use of my novel contraction and expansion nozzles to over 1700 lbs. per hour. The foam so made was of high quality with a specific gravity of about .085.

I have further produced very good results with angel food cake by employing my invention on a mixer of the type described in the above mentioned Oakes patent. The following ingredients and proportions were used:

30 lbs. egg white
30 lbs. sugar
10 lbs. flour
7½ ozs. salt
7½ ozs. cream of tartar
4 ozs. vanilla Cakes baked from batter mixed without my invention failed to incorporate the air and were low in volume. I found that restricting the discharge orifice with a valve to create back pressure in the machine improved the volume of the cakes, but not sufficiently to compare with commercial cakes now on the market. Such cakes generally measure 1800 to 2600 cc. per lb. averaging about 2200 cc. per lb. The cakes produced with the back pressure valve had a volume of about 1500 cc. per lb.

With my invention attached to the continuous mixer, I was able to produce cakes measuring in excess of 2500 cc. per lb. and of very fine grain and texture.

I made these cakes from the above formula by pre-mixing all the ingredients at one time in a tank, pumping this mix through a continuous foaming mixer of the above type with the necessary amount of air or gas, and depositing the foamed mix from the discharge nozzle into the baking pans. However, if desired, the pre-mixing may be also done by a continuous method.

I found that I achieved satisfactory results by employing my invention so as to create an internal or back pressure in the mixing machine in excess of 30 p. s. i. g.

To my knowledge, this is the first time that angel food cake has been produced by blending all the ingredients at one time. Ordinarily, the egg white is pre-whipped and flour and sugar then carefully folded in.

This invention may also be used for marshmallow, fondants and other whipped or foamed confections.

It is understood that suitable modifications may be made in the structure as disclosed, for example, the nozzle need not be circular in cross-section but may be rectangular or polyhedral, within the scope of the appended claims.

I claim:

1. A device securable to the discharge port of a continuous frothing machine of the closed type to supply flow resistance to the discharged foam whereby back pressure is created within said machine, said device comprising a slowly tapered contraction nozzle, a conduit of small diameter attached to the distal and small end of said contraction nozzle to create flow resistance to maintain greater than atmospheric pressure in said machine and an expansion nozzle engaged on its end of small diameter by the distal end of said conduit to permit said foam to expand gradually therein and decrease the velocity of said discharged foam, said nozzles and conduits presenting an uninterrupted and imperforate wall to conatct with said foam to avoid creation of turbulence in the foam.

2. The device set forth in claim 1 in which said expansion nozzle has a conical angulation not exceeding 14°.

3. The device set forth in claim 1 in which said contraction nozzle has a conical angularity no greater than 25° and said expansion nozzle has a conical angulation not exceeding 14°.

4. The device set forth in claim 1 in which said expansion nozzle has a conical angulation of approximately 5½°.

5. The device set forth in claim 1 in which said contraction nozzle has a conical angulation not exceeding 25°.

References Cited in the file of this patent

UNITED STATES PATENTS

| Number | Name | Date |
|---|---|---|
| 1,874,209 | Schnabel | Aug. 30, 1932 |
| 2,183,561 | Hamblin | Dec. 19, 1939 |
| 2,202,176 | Timpson | May 28, 1940 |
| 2,249,095 | Swift | July 15, 1941 |
| 2,541,751 | Dodelin | Feb. 13, 1951 |
| 2,581,918 | Spencer | Jan. 8, 1952 |

FOREIGN PATENTS

| Number | Country | Date |
|---|---|---|
| 128,438 | Germany | May 25, 1932 |
| 377,646 | Italy | Dec. 27, 1939 |